United States Patent [19]

Staples et al.

[11] Patent Number: 6,090,875

[45] Date of Patent: *Jul. 18, 2000

[54] DUST CONTROL OF ABSORBENT POLYMERS

[75] Inventors: Thomas L. Staples; Jerry D. DeVrieze, both of Midland, Mich.

[73] Assignee: The Dow Chemical Company, Midland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/602,408

[22] Filed: Feb. 16, 1996

[51] Int. Cl.⁷ .............................. C08K 5/01; C08K 5/101; C08K 5/05

[52] U.S. Cl. ..................... 524/313; 524/388; 524/555; 524/556

[58] Field of Search ................... 524/269, 300, 524/306; 313/315, 385, 388, 556, 555

[56] References Cited

U.S. PATENT DOCUMENTS

| | | | |
|---|---|---|---|
| 4,080,351 | 3/1978 | Zalzal | 524/421 |
| 4,108,780 | 8/1978 | Thomas | 510/528 |
| 5,597,873 | 1/1997 | Chambers et al. | 525/330.1 |
| 5,681,878 | 10/1997 | Klotzsche et al. | 524/269 |
| 5,728,742 | 3/1998 | Staples | 521/57 |

FOREIGN PATENT DOCUMENTS

| | | |
|---|---|---|
| 2147545 | 10/1995 | Canada . |
| WO9422940 | 10/1994 | WIPO . |

*Primary Examiner*—Christopher Henderson

[57] ABSTRACT

The subject invention provides water-swellable polymer compositions having reduced dusting tendencies, i.e., reduced amounts of unassociated dust having a maximum diameter less than or equal to 10 microns and/or the tendency to generate reduced amounts of unassociated dust having a maximum diameter less than or equal to 10 microns upon attrition and a process for preparing such compositions. Hydrophobic dedusting agents are used to achieve the above while substantially maintaining or increasing the surface tension of an aqueous fluid in equilibrium with the polymer and air.

14 Claims, No Drawings

DUST CONTROL OF ABSORBENT POLYMERS

FIELD OF INVENTION

The subject invention pertains to attrition-resistant absorbent polymers having reduced levels of unassociated dust and to a process for the preparation of such polymers.

BACKGROUND AND SUMMARY OF THE INVENTION

In the gel polymerization of absorbent polymers, i.e., water-swellable polymers, monomers are polymerized in aqueous solution. Certain additives, such as crosslinking agents, may be incorporated into the monomer mixture. The product of the polymerization process is typically dried and subjected to mechanical means of particle size reduction and classification including chopping, grinding, and sieving. During such particle size reduction, ultrafine particles or dust, i.e., particles having a mean diameter less than about 10 microns, are unavoidably created.

WO 94/22940, published Oct. 13, 1994, discloses a water-swellable polymer composition and process for the production thereof. The composition has reduced dusting tendencies and is attrition-resistant. The reduced dusting is due to coating the polymer particles with a dedusting agent selected from such hydrophilic compounds such as aliphatic polyols and polyalkylene glycols. WO 94/22940 states that employing compounds such as these does not detrimentally affect the performance of the polymer. However, it has been discovered that when the water-swellable polymer products of the process of WO 94/22940 are swollen with an aqueous fluid, the surface tension of the fluid in contact with the swellable polymer product and air is decreased from that of a fluid in contact with untreated polymer products. This is unfortunate because surface tension of the contacting fluid at equilibrium is one of the measures of the performance of a water-swellable polymer.

Surface tension of the contacting fluid at equilibrium is used as a measure of performance because water-swellable polymers yielding a fluid with higher surface tension generally tend to "wick" better, i.e. the polymer transports aqueous fluids by capillary flow more efficiently and holds the fluids more strongly. As U.S. Pat. No. 5,352,711 discusses, wicking is very important for absorbent devices such as diapers or sanitary articles. The effect of surface tension on capillary flow and capillary pressure is described more fully by the Lucas-Washburn equation as discussed by P. K. Chatterjee, *"Absorbency"*, Elsevier, Amsterdam, 1985, pp. 36–37.

Industry would find great advantage in a water-swellable, attrition-resistant polymer composition which does not dust, e.g., which comprises no more than 2.5 parts per million (ppm) unassociated particles less than 10 microns in diameter, and which substantially maintains or increases the surface tension of aqueous fluids when the latter are in equilibrium with the composition and air as compared to compositions comprising greater than 2.5 ppm unassociated particles less than 10 microns in diameter. Industry would further find advantage in a new process which reduces the level of particles less than 10 microns in diameter in a given composition by at least 80 percent and/or provides a composition comprising no more than 2.5 ppm unassociated particles less than 10 microns in diameter while substantially maintaining or increasing the surface tension of an aqueous fluid when it is in equilibrium with the composition and air.

Accordingly, the subject invention provides a composition comprising gel-polymerized, water-swellable polymer particles, the particles bearing on their surface a physical coating of a hydrophobic dedusting agent, wherein the composition comprises no more than 2.5 ppm unassociated dust having a maximum diameter less than or equal to 10 microns. The surface tension of an aqueous fluid in equilibrium with the composition and air is substantially maintained or increased as compared to untreated gel-polymerized, water-swellable polymer particles. The composition absorbs at least 20 grams of a 0.9 weight percent aqueous saline solution under a pressure of 0.3 psi (21,000 dynes/cm$^2$), i.e., a 60 minute 0.3 psi (21,000 dynes/cm$^2$) AUL greater than 20 grams/gram as measured in accordance with the Absorption Under Load Test set forth in U.S. Pat. No. 5,147,343, incorporated herein by reference. The composition is attrition-resistant in that it contains less than about 100, preferably less than about 65 ppm of unassociated dust having a maximum diameter less than or equal to 10 microns after having been roll milled for 20 minutes.

The subject invention further provides a process which comprises:

(a) preparing a water-swellable hydrogel by gel polymerization;

(b) drying and sizing the hydrogel to form a composition comprising dried and sized particles, the composition having a first amount of unassociated dust having a maximum diameter less than or equal to 10 microns; and (c) contacting the composition with an effective amount of a hydrophobic dedusting agent to form an attrition-resistant, dedusted composition, wherein the attrition-resistant, dedusted composition is characterized by:

(1) a 60 minute 0.3 psi (21,000 dynes/cm$^2$) AUL greater than 20 grams/gram whereupon the attrition-resistant, dedusted composition has a second amount of unassociated dust having a maximum diameter less than or equal to 10 microns, the second amount being less than about 20, preferably less than about 10, more preferably less than about 5, most preferably less than about 1 percent of the first amount and/or the second amount of unassociated dust being less than 2.5 ppm of the attrition-resistant, dedusted composition;

(2) a tendency to generate a third amount of unassociated dust having a maximum diameter less than or equal to 10 microns upon roll milling of the attrition resistant, dedusted composition for 20 minutes, the third amount being less than or equal to the first amount, preferably less than about 100, more preferably less than about 65 ppm of the attrition resistant, dedusted composition; and (3) a surface tension such that when an aqueous fluid is in equilibrium with the attrition resistant, dedusted composition and air, the surface tension of the aqueous fluid is substantially maintained or increased as compared to an untreated gel-polymerized, water-swellable polymer composition.

DETAILED DESCRIPTION OF THE INVENTION

As used herein, the term "substantially maintain or increase the surface tension" means that when an aqueous fluid is in equilibrium with another fluid and the attrition-resistant, water-swellable polymers treated with a hydrophobic dedusting agent of the present invention, the surface tension of the aqueous fluid, as measured by a surface tension test disclosed hereinafter, is decreased by less than about ten percent, preferably less than about five percent, when compared to water-swellable polymers that are not contacted with a hydrophobic dedusting agent. More specifically, the aqueous fluid employed in the surface tension test disclosed herein is a 0.9 percent NaCl solution and the other fluid is air.

As used herein, the term "unassociated dust" means the portion of a water-absorbent polymer particle composition having a maximum diameter less than or equal to 10 microns, which portion is rendered airborne when air is applied to the composition. More specifically, the air is applied and the portion is measured using a pulsed jet disperser described below.

As used herein the term "physical coating" means that the dedusting agent is in contact with both the polymer particles and dust without chemically reacting, e.g. no surface crosslinking reaction occurs between the dedusting agent and the polymer particles or dust.

The water-swellable or lightly crosslinked hydrophilic polymers that are employable in the present invention can be any of the known hydrophilic polymers which are capable of absorbing large quantities of fluids. In particular, water-absorbent polymers useful in this invention are water-absorbent polymers which contain carboxyl moieties. Preferably, at least about 0.01 equivalent of carboxyl groups are present per 100 grams of the water-absorbent resin.

Among preferred carboxyl-containing water absorbent polymers are hydrolyzates of starch-acrylonitrile graft copolymers, partially neutralized products of starch-acrylic acid or starch-polyvinyl alcohol graft copolymers, saponification products of vinyl acetate acrylic ester copolymers, derivatives of copolymers of isobutylene and maleic anhydride, hydrolyzates of acrylonitrile copolymers, crosslinked products of hydrolyzates of acrylonitrile copolymers, crosslinked carboxy methyl cellulose, hydrolyzates of acrylamide copolymers, crosslinked products of hydrolyzates of acrylamide copolymers, partially neutralized products of polyacrylic acids and crosslinked products of partially neutralized polyacrylic acids.

Examples of some suitable polymers and processes, including gel polymerization processes, for preparing them are disclosed in U.S. Pat. Nos. 3,997,484; 3,926,891; 3,935,099; 4,090,013; 4,093,776; 4,340,706; 4,446,261; 4,683,274; 4,459,396; 4,708,997; 4,076,663; and 4,190,562, which are incorporated herein by reference. Such hydrophilic polymers are prepared from water-soluble $\alpha,\beta$-ethylenically unsaturated monomers such as monocarboxylic acids, polycarboxylic acids, acrylamide and their derivatives.

Suitable $\alpha,\beta$-ethylenically unsaturated monomers include, for example, acrylic acid, methacrylic acid, crotonic acid, isocrotonic acid and alkali metal salts and ammonium salts thereof; itaconic acid, acrylamide, methacrylamide and 2-acrylamido-2-methyl-1-propane sulfonic acid and its salts. The preferred monomers include acrylic acid and methacrylic acid and their respective salt forms such as alkali metal or ammonium salts.

The water-soluble monomers useful in the present invention may be used in amounts ranging from about 10 percent to about 80 percent by weight based on the total weight of the aqueous monomer solution. Preferably, the amount ranges from about 15 percent to about 60 percent based on the total weight of the aqueous monomer solution.

Optionally, minor amounts of other water-soluble, unsaturated monomers, such as alkyl esters of the acid monomers, e.g., methyl acrylate or methyl methacrylate may be present in the water absorbent polymer. In addition, certain grafting polymers, such as, for example, polyvinyl alcohol, starch and water soluble or swellable cellulose ethers may be employed to prepare products having superior properties. Such grafting polymers, when employed, are used in amounts up to about 10 weight percent based on the $\alpha,\beta$-ethylenically unsaturated monomer. Further, it may be advantageous to include a chelating agent to remove trace metals from solution, e.g., when a metal reaction vessel is employed. One such chelating agent is VERSENEX™ V-80 (an aqueous solution of the pentasodium salt of diethylenetriamine pentacetic acid) (Trademark of The Dow Chemical Company). Such chelating agents, when employed, are generally used in amounts between about 100 and about 2000 ppm based on the $\alpha,\beta$-ethylenically unsaturated monomer.

It is desirable to obtain a level of conversion of monomer to polymer of at least about 95 percent. The polymerization may be carried out using acid monomers that are not neutralized or that have been neutralized or partially neutralized prior to the polymerization. Neutralization is conveniently achieved by contacting the aqueous monomer with an amount of basic material sufficient to neutralize between about 20 and about 95 percent of the acid groups present in the acid monomers. Preferably, the amount of basic material will be sufficient to neutralize between about 40 percent and 85 percent, and most preferably between about 55 percent and about 75 percent of the acid groups present in the acid monomers. When pre-neutralizing the monomer solution, it is important to control the neutralization conditions so that the heat of neutralization does not cause the premature polymerization of the monomer mixture. The neutralization is advantageously carried out at temperatures below about 40° C., preferably at temperatures below about 35° C.

Compounds which are useful to neutralize the acid groups of the monomer are typically those which will sufficiently neutralize the acid groups without having a detrimental effect on the polymerization process. Such compounds include alkali metal hydroxides, and alkali metal carbonates and bicarbonates. Preferably, the material used to neutralize the monomer is sodium or potassium hydroxides or carbonates. In determining the desired degree of neutralization, care must be taken to ensure that the pH of the resulting crosslinked absorbent polymer, which will be contacted with or dispersed in an aqueous fluid to be absorbed, is maintained in a range appropriate for the applications for which the polymer is intended. Alternatively, the polymerization may be carried out employing unneutralized monomers and thereafter neutralizing, as is known in the art.

Conveniently, a conventional vinyl addition polymerization initiator is used in the polymerization of the water-soluble monomers and the crosslinking agent. A free radical polymerization initiator which is sufficiently soluble in the monomer solution to initiate polymerization is preferred. For example, water soluble persulfates such as potassium persulfate, ammonium persulfate, sodium persulfate, and other alkali-metal persulfates, hydrogen peroxide and water soluble azo-compounds such as 2,2'-azobis (2-amidinopropane·HCl) may be used. Some of these initiators, such as hydrogen peroxide, can be combined with reducing substances such as sulfites or amines to form known redox type initiators. The total amount of initiators used may range from about 0.01 to about 1.0 weight percent, preferably about 0.01 to about 0.5 weight percent, based on the total weight of $\alpha,\beta$-ethylenically unsaturated monomer reactants.

The water-absorbent resin will preferably be lightly crosslinked to render it water-insoluble and water-swellable.

The desired crosslinked structure may be obtained by the copolymerization of the selected water-soluble monomer and a crosslinking agent possessing at least two polymerizable double bonds in the molecular unit. The crosslinking agent is present in an amount effective to crosslink the water-soluble polymer. The preferred amount of crosslinking agent is determined by the desired degree of absorption capacity and the desired strength to retain the absorbed fluid, i.e., the desired absorption under load (AUL). Typically, the crosslinking agent is used in amounts ranging from about 0.0005 to about 5 parts by weight per 100 parts by weight of α,β-ethylenically unsaturated monomer used. More preferably, the amount ranges from about 0.1 to about 1 part by weight per 100 parts by weight of the α,β-ethylenically unsaturated monomer. Usually, if an amount over about 5 parts by weight of crosslinking agent per 100 parts is used, the resulting polymer has too high a crosslinking density and exhibits a reduced absorption capacity and increased strength to retain the absorbed fluid. If the crosslinking agent is used in an amount less than about 0.0005 part by weight per 100 parts, the polymer usually has too low a crosslinking density, and when contacted with the fluid to be absorbed becomes sticky and exhibits a lower initial absorption rate.

While the crosslinking agent will typically be soluble in the aqueous solution of the α,β-ethylenically unsaturated monomer, the crosslinking agent may be merely dispersible in such a solution, without negative implications. The use of such dispersing agents is disclosed in U.S. Pat. No. 4,833,222, incorporated herein by reference. Suitable dispersing agents include carboxymethyl cellulose suspending aids, methyl cellulose, hydroxypropyl cellulose, and polyvinyl alcohol. Such dispersing agents are typically provided at a concentration between about 0.005 and about 0.1 weight percent, based on the total weight of α,β-ethylenically unsaturated monomer reactants.

Typical crosslinking agents include monomers having in one molecule 2 to 4 groups selected from the group consisting of $CH_2=CHCO-$, $CH_2=C(CH_3)CO-$ and $CH_2=CH-CH_2-$. Exemplary crosslinking agents are diacrylates and dimethacrylates of ethylene glycol, diethylene glycol, triethylene glycol, propylene glycol, 1,4-butanediol, 1,5-pentanediol, 1,6-hexanediol, neopentyl glycol, trimethylolpropane and pentaerythritol; triacrylates and trimethacrylates of trimethylolpropane and pentaerythritol; highly ethoxylated trimethylol propane triacrylate; tetracrylate and tetramethacrylate of pentaerythritol; and tetraallyloxyethane.

As noted in WO 93/05080, published on Mar. 18, 1993, incorporated herein by reference, a certain class of crosslinking agents yields particularly preferred absorptive properties. Such preferred crosslinking agents include methylenebisacrylamide, bis(acrylamido)acetic acid and its salts, allyl acrylate, allyl methacrylate, and esters or amides having both a vinyl and an allyl functionality. Other particularly preferred crosslinking agents and methods include those disclosed in WO 94/20547, published on Sep. 15, 1994, incorporated herein by reference. Such preferred crosslinking agents include mixtures of polyvinyl compounds such as, for example, highly ethoxylated trimethylolpropane triacrylate and allyl mathacylate, and polyglycols such as, for example, polyethylene glycol.

In a preferred embodiment for making polymers useful in the practice of this invention, an aqueous solution of the α,β-ethylenically unsaturated monomer in the partially neutralized form, the crosslinking agent, the initiator and a grafting polymer substrate, if desired, is prepared.

The polymerization of the mixture may be initiated by elevating the temperature of the mixture containing the initiator or by using a redox-type initiator as described above. Generally, the temperature at which polymerization will begin ranges from about 20° C. to about 45° C. The temperature at which the polymerization is carried out is highly dependent on the type of monomers used and the specific initiator system employed. Preferably, the maximum temperature of polymerization ranges from about 50° C. to about 100° C., most preferably from about 60° C. to about 100° C. The method by which the temperature of the polymerization is controlled is not critical so long as sufficient cooling is present to remove the heat which is generated during the polymerization.

The resultant polymer is typically pre-sized and dried using means well-known in the art. Suitable drying means include fluidized bed driers, rotary driers, forced air ovens, through-circulation band driers, etc. In some instances, drying will occur in two or more stages, i.e. multi-stage drying. In multi-stage drying, the pre-sized polymer particles are partially dried in the initial stage or stages, e.g., the pre-sized polymer particles are dried to less than about 25, preferably less than about 20 percent moisture level. Drying to less than about 10, preferably less than about 5 percent moisture level is accomplished during the completion of drying stages. During the initial stage or stages of drying, the pre-sized particles typically fuse together into sheets. Following the completion of drying, the polymer is more completely sized to form particles having an average diameter less than about 0.8 mm. During such sizing, dust, characterized by extremely small particle sizes may result, i.e., particle sizes less than or equal to 10 microns. The amount of dust generated will vary based on manufacturing procedures.

To improve absorptive properties, the dried particles may be heat treated in accordance with the procedures set forth in WO 93/05080, published on Mar. 18, 1993 and/or WO 94/20547, published on Sep. 15, 1994, incorporated herein by reference. In particular, the dried particles are heated for a time sufficient to increase the modulus, centrifuge capacity, and/or the absorbency under load. An oxidizing agent, such as a bromate, chlorate, chlorite, or mixture thereof, may be uniformly distributed within the water absorbent polymer prior to such heat treatment to enhance one or more of the preceding properties. Such heat treatment is preferably carried out at a temperature of at least about 170, more preferably of at least 180, and most preferably of at least about 190° C. Such heat treatment is preferably carried out at a temperature of less than about 250, more preferably less than about 240° C.

The time period for heat treatment should be sufficient to effect an improvement in absorptive properties. The exact times of heat treatment required will be affected by the equipment chosen, and can be determined empirically by examination of product properties. Preferably, the time is at least about 3 minutes, and more preferably at least about 5 minutes. If the time is too long, the process becomes uneconomical and a risk is run that the absorbent resin may be damaged. Preferably, the maximum time of heating is about 150 minutes or less, more preferably 60 minutes or less.

The method of heat treatment is not critical. For example, forced air ovens, fluidized bed heaters, heated screw conveyors, and the like may be successfully employed. If desired, the heated polymer may be remoisturized for ease in handling. While such remoisturization may serve to decrease the amount of unassociated dust, it may lead to clumping of the polymer product.

Another way to improve absorptive properties of the polymer particles may be to surface crosslink the polymer particles. Procedures for surface crosslinking are well known in the art and described in, for example, DE 4244548, DE 4020780, EP 605150, U.S. Pat. No. 4,734,478, and U.S. Pat. No. 4,666,983. These procedures, like heat treatment, may increase the modulus, centrifuge capacity, and/or the absorbency under load of the polymer particles.

To reduce levels of unassociated dust and to inhibit the production of unassociated dust during handling of the polymer material, the dried and optionally heat treated or surface crosslinked particles are contacted with an effective amount of a dedusting agent. The dedusting agent serves to adhere the dust together into larger clusters, to the larger polymer particles, or to the walls of the mixing vessel or container in which the polymer is retained during handling, all of which will translate to reduced levels of unassociated dust in the finished polymer product at the various stages of handling. Moreover, the application of the dedusting agent to the polymer samples does not substantially detrimentally affect the performance or properties of the polymer. Particularly, the surface tension of an aqueous fluid in equilibrium with the polymer and air is substantially maintained or increased.

As defined herein, the term "effective amount of a dedusting agent" means an amount of a hydrophobic material which, when applied to the polymer material, reduces the concentration of unassociated dust having a diameter of less than 10 microns by at least about 80, preferably at least about 90, more preferably by at least about 95, and most preferably by at least about 99 percent and/or which produces dedusted compositions comprising less than 2.5 ppm unassociated dust having a maximum diameter less than or equal to 10 microns.

Preferred dedusting agents are hydrophobic organic materials which do not substantially penetrate into the interior of the polymer particles, i.e. the dedusting agent is present at the surface of the particles, even when provided in small amounts. Suitable dedusting agents do not substantially impede the absorption of aqueous fluids by the polymer and substantially maintain or increase the surface tension of aqueous fluids when they are in equilibrium with the composition and air as measured by the surface tension test disclosed herein.

For ease of contacting the hydrophobic dedusting agent with the polymer, it is preferred that the dedusting agent be a liquid with a viscosity such that the agent may be easily handled. Typically, the agent's viscosity should be below about 12,500, preferably below about 10,000 centipoise upon contact with the polymer. Likewise, the volatility and/or boiling point of the hydrophobic dedusting agents should not be so high that the agent evaporates from the surface of the particles upon shipping and handling. Typically, the agent should not boil at more than 400° C. and not less than about 100° C., preferably not less than about 150° C., especially if higher temperatures are to be employed at the time of contact to increase the speed of coating the polymer particles as described below.

Exemplary hydrophobic dedusting agents may include aliphatic hydrocarbon oils, such as as mineral oil, and alkanes or alkenes having between about 7 and about 18 carbon atoms optionally substituted with OH, $CO_2H$ or esters thereof. Natural oils such as castor, corn, cottonseed, olive, rapeseed, soybean, sunflower, other vegetable and animal oils, as well as esters, alcohols, and acids of the oils are useful in the invention as well as silicone oils of similar viscosities. The above compounds may be employed in purified form, in solutions, or in mixtures.

As described above, an "effective amount" of hydrophobic dedusting agent is that amount which reduces the concentration of unassociated dust having a diameter of less than 10 microns by at least about 80, preferably at least about 90, more preferably by at least about 95, and most preferably by at least about 99 percent and/or which produces dedusted compositions comprising less than 2.5 ppm unassociated dust having a maximum diameter less than or equal to 10 microns. This effective amount will vary based upon the amount of dust initially present, the type of water-absorbent polymer, and the hydrophobic dedusting agent employed. Generally, the amount is at least 100, preferably at least 200, more preferably at least 300 ppm based on the weight of the polymer particles. The amount is generally, less than 6000, preferably less than 3000, more preferably less than 1000 ppm based on the weight of the polymer particles.

Although it is not necessary to include solvents in the addition of the hydrophobic treatment to the dry polymer powder, solvents can be employed in amounts such that effective dedusting by the hydrophobic treatment is still observed. Typically, amounts of solvent up to 20 times the amount of the hydrophobic treatment may be employed. When an organic solvent is employed, it may be desirable to utilize a solvent which is readily removed from the coated particles, e.g., by evaporation. Especially suitable solvents include light hydrocarbons such as hexane, alcohols, and mixtures thereof. One especially preferred embodiment may be to utilize the hydrophilic dedusting compounds of WO 94/22940, such as polyether polyols, as solvents in amounts which do not substantially affect the surface tension of an aqueous fluid in equilibrium with the polymer and air. By employing the hydrophilic dedusting agents as solvents, one may obtain an additive effect with respect to the dedusting tendency, yet may not have the problem of increased surface tension which occurs when the hydrophilic agents are used alone.

In some cases, it may be beneficial to disperse the hydrophobic dedusting agent in a liquid in order to facilitate the addition of the dedusting agent to the water-swellable polymer particles. Many liquids, including water may be employed as the medium for the dispersion. It may be advantageous to employ a dispersing agent if the particular dedusting agent is difficult to disperse. Among useful dispersing agents are the hydrophilic dedusting agents disclosed in WO 94/22940. If a solvent, a dispersing medium, a dispersing agent, or any other additive is to be employed in conjunction with the hydrophobic dedusting agent, one must ensure that the addititive does not substantially lower the surface tension of a fluid in equilibrium with the water-swellable polymer. This is accomplished by utilizing the surface tension test disclosed herein.

The dried and optionally heat treated, surface crosslinked, or otherwise treated polymer particles and the dedusting agent should be contacted under conditions such that the particles can be coated with the dedusting agent. Preferably, such contacting will be conducted with some form of mechanical distribution, such that adequate distribution of the dedusting agent on the water-absorbent resin particles occurs. Examples of blending equipment/processes include simple tumbling of a jar, or blending in a conical dryer, ribbon blender, drum tumbler, etc. Moderate stirring, shaking, grinding or even conveying the particles a short distance in a screw-conveyer can be sufficient for such adequate distribution of the dedusting agent over the particles, particularly if the particles are at an elevated temperature.

The temperature of contacting is not critical and generally can be any temperature at which the dedusting agent does not evaporate, solidify, become too viscous, or significantly react with the carboxyl moieties of the absorbent resin polymer. Such temperatures are typically from about 20 to about 150° C., preferably from about 20 to about 60° C. It should be noted that elevated temperatures, i.e., those above ambient temperature, i.e., above about 25° C., improve the speed of coating of the particles.

While not necessary, the dedusted compositions may be further blended with a particulate flowability enhancer. When utilized, the particulate flowability enhancer should be provided in an amount such that the final composition has a concentration of unassociated dust, i.e., particles having a maximum diameter less than or equal to 10 microns, that is less than about 20, preferably less than about 10, more preferably less than about 5, most preferably less than about 1 percent of the amount of dust before treatment with the dedusting agent and/or comprises less than 2.5 ppm unassociated dust having a maximum diameter less than or equal to 10 microns. One such flowability enhancer is an ultra-microscopic silica having a BET surface area of at least 50 $m^2/g$ and a particle diameter less than or equal to 0.05 micron, such as AEROSIL™ R972 (available from Degussa Inc.). The amount of silica utilized is advantageously kept small because silica dust, as well as dust from the absorbent polymer, will contribute to the total dust. Generally, less than 10 weight percent, preferably less than 1 weight percent, more preferably less than 1000 ppm of silica based on the weight of the dedusted composition is employed.

The superabsorbent polymers of this invention are useful in the manufacture of moisture absorbent articles, such as disposable diapers, sanitary napkins, incontinence garments, bandages, and the like. The superabsorbent compositions of this invention are particularly useful in the manufacture of thin and ultra thin disposable diapers which have excellent moisture absorbance capacity, fluid distribution properties and reduced leakage.

In making absorbent articles with the compositions of this invention, the superabsorbent composition may be mixed with, attached to, layered in, or dispersed in a porous matrix of fibers. Such matrices are made with hydrophilic fibers such as wood pulp or fluff, cotton linters, and synthetic fibers or a mixture of the fibers and the wood fluff. The fibers can be loose or joined as in nonwovens. The synthetic fibers can be polyethylene, polypropylene, polyesters, copolymers of polyesters and polyamides and the like. The synthetic fibers may be meltblown fibers or fibers which have been treated to render them hydrophilic. Additionally, the superabsorbent polymers of the invention may be incorporated in the absorbent article in a compartment or localized area of the absorbent structure.

Absorbent articles, such as disposable diapers, are made with a liquid-impermeable backing material, a liquid-permeable bodyside facing material and the liquid-absorbing composite sandwiched between the backing material and the facing material. The liquid-impermeable backing material can be made from commercially available polyolefin film and the liquid-permeable facing material can be made from a commercially available nonwoven material, such as spunbonded or corded fibrous web which is wettable and capable of passing urine.

The absorbent articles of the invention may comprise from about 5 percent to about 95 percent by weight of the superabsorbent polymers of the invention. In a typical absorbent article, the superabsorbent polymer of the invention may be dispersed in a fiber matrix in which the superabsorbent is present in an amount from about 30 to 70 weight percent and the fiber matrix comprising 70 to 30 weight percent of the article. In another form of absorbent article, the superabsorbent may be present in a containment structure in which the superabsorbent polymer is present in an amount of about 30 to 95 percent by weight. Combinations of dispersed superabsorbent polymer and contained superabsorbent polymer are also known.

The superabsorbent polymers of this invention can be used in the manufacture of absorbent articles such as those described in U.S. Pat. Nos. 3,669,103; 3,670,731; 4,654,039; 4,699,823; 4,430,086; 4,973,325; 4,892,598; 4,798,603; 4,500,315; 4,596,567; 4,676,784; 4,938,756; 4,537,590; 4,935,022; 4,673,402; 5,061,259; 5,147,343; 5,149,335; and 5,156,902; the teachings of which are hereby incorporated by reference.

The process for measuring the amount of unassociated dust having a diameter less than a predetermined size present in a water-swellable polymer composition is described below. In the case of the Examples, the measurement process was used to determine the amount of unassociated matter having a maximum size less than or equal to 10 microns. The process is applicable, however, to measure the amount of unassociated dust having a diameter less than other predetermined sizes, the predetermined sizes typically consistent with either the manufacturer's or the purchaser's specifications. The process comprises:

(a) placing the composition into the sample holder of a pulsed jet disperser;

(b) blasting the composition with air dried by passage through dehydration means; and (c) determining the weight of particles in each of a plurality of size increments.

Dehydration means are suitable to reduce the amount of water present in the air to be used to blast the polymer composition. Suitable dehydration means include molecular sieve cartridges, dessicating materials, membranes, etc. An especially preferred dehydration means is a molecular sieve cartridge.

The dust levels of the coated samples may be measured as follows. Approximately 0.01 to 0.2 grams of the sample to be tested is placed in the sample holder of a pulsed jet disperser, for example an AEROSIZER™ jet disperser available from Amherst Process Instruments of Hadley, Mass. The pulsed jet disperser is fitted with a 250 micron screen to prevent particles greater than 250 microns in diameter from entering the detector. The air delivered to the pulsed jet disperser is filtered using the factory supplied filter and is dried using a molecular sieve cartridge. The samples are blasted with the dried air, with the exhaust stream being directed to the detector and analyzed until the instantaneous count rate decays to less than 20 particles per second on the low sensitivity setting of the detector.

Measurements are made on separate portions of the samples and are averaged. For each portion, a determination is made of the total number of particles in each of 500 size increments evenly distributed logarithmically from 0.2 to 200 microns, the instrument exhibiting an approximate lower level of detection of 0.5 microns. The weight of material in each of these size increments is calculated using the following formula (1):

$$\text{Weight} = (\text{number of particles in an increment})(\text{density})(\pi)(\text{particle diameter}^3)/6. \quad (1)$$

For sodium polyacrylate superabsorbent materials, the density is assumed to be 1.60 $g/cm^3$.

The aggregate weight of unassociated material less than 10 microns is designated weight$_{dust}$. This weight is compared to the weight of sample originally introduced into the disperser, i.e., weight$_{sample}$. The percent dust is determined in accordance with equation (2):

$$\text{Weight percent dust (\%)}=100(\text{weight}_{dust})/(\text{weight}_{sample}). \quad (2)$$

The following examples are provided for the purpose of explanation rather than limitation. It will be noted that the water-swellable polymer samples are standard commercially available materials. The actual composition of these materials before treatment is not relevant to the present invention, i.e., the invention would be expected to be applicable to any commercially available water-swellable polymer materials.

EXAMPLE 1

A test is conducted to compare the dustiness of water-swellable polymers and the surface tension of a liquid in contact with said polymers which are treated with hydrophobic agents of the instant invention and polymers treated with a hydrophilic agent of WO 94/22940.

A water-swellable polymer is obtained. The polymer is DRYTECH™ 2035 superabsorbent (available from The Dow Chemical Company), a 62 percent neutralized polyacrylate crosslinked with trimethylolpropane triacrylate. Dedusting agents, as identified in Table 1, are added dropwise to samples of the polymer at 25° C. The coated particles are then rolled for 30 minutes to distribute the dedusting agent on the particle surfaces. The amount of dust below 10 microns is measured as described in the test immediately preceding these examples and the results with respect to each sample is set forth in Table 1.

The surface tension of the liquid is measured using a Du Noüy tensiometer. The particular tensiometer employed was a Processor Tensiometer K12™ from Krüss. The preparation of an aqueous fluid to be measured, in equilibrium with the absorbent polymer and air, is substantially adapted from U.S. Pat. No. 4,654,039. One gram samples of each of the above treated absorbent polymers, i.e., the control (untreated) absorbent polymer, the absorbent polymers treated with various hydrophobic dedusting agents, and the comparative sample of absorbent polymer treated with hydrophilic dedusting agent of WO 94/22940, is shaken with 200 grams of a 0.9 weight percent NaCl solution to simulate a urine solution. The surface tension of this decanted fluid is then measured with a tensiometer. The results are summarized below in Table 1.

TABLE 1

| Sample | Dedusting Agent | Weight Of Dust Below 10 microns (ppm) | Surface Tension (dynes/cm) |
|---|---|---|---|
| 1 | none (control) | 27 | 69.2 |
| 1A | 300 ppm LITTLE ONES ™ baby oil | 0.85 | 66.7 |
| 1B | 1000 ppm LITTLE ONES ™ baby oil | 0.27 | 70.0 |
| 1C | 1000 ppm CRISCO ™ cooking oil | 0.6 | 68.4 |
| Comparative Sample | 600 ppm VORANOL ™ 2070 polyether polyol | 0.39 | 62.1 |

EXAMPLE 2

A test is conducted to compare dustiness of the polymers treated with hydrophobic agents (Samples 1, 1A, 1B, and 1C) before attrition and after attrition.

About 10 grams each of the untreated and hydrophobically treated polymers of Example 1 (Samples 1 to 1C) are added to an 8 ounce jar which is approximately half-filled with ceramic rod segments which are about 7 millimeter (mm) long and about 7 mm in diameter. The jar is capped, taped closed, and is rolled on a roll mill for 20 minutes. Upon completion of rolling, the rods are separated from the polymer sample using an ⅛ inch (3 mm) mesh screen. The amount of unassociated dust is measured as described above. The results are summarized in Table 2 below.

TABLE 2

| Sample | Dedusting Agent | Weight of Dust Below 10 microns before attrition (ppm) | Weight Of Dust Below 10 microns after attrition (ppm) |
|---|---|---|---|
| 1 | none (control) | 27 | 4700 |
| 1A | 300 ppm LITTLE ONES ™ baby oil | 0.85 | 63 |
| 1B | 1000 ppm LITTLE ONES ™ baby oil | 0.27 | 17 |
| 1C | 1000 ppm CRISCO ™ cooking oil | 0.6 | 26 |

EXAMPLE 3

A test is conducted to determine the centrifuge capacity (CC) and the 60 minute 0.3 pounds per square inch (21,000 dynes/cm$^2$) Absorption Under Load (AUL) and 60 minute 0.6 pounds per square inch (42,000 dynes/cm$^2$) AUL of Samples 1, 1A, 1B, and 1C.

Centrifuge capacity is determined as described in U.S. Pat. No. 4,286,082, which is incorporated herein by reference, except that an absorption time of 30 minutes is employed rather than 3 to 5 minutes; 60 minute 0.3 pounds per square inch (21,000 dynes/cm$^2$) AUL and 60 minute 0.6 pounds per square inch (42,000 dynes/cm$^2$) AUL are measured as described in U.S. Pat. No. 5,147,343, which is incorporated by reference. The results are shown in Table 3.

TABLE 3

| Sample | Dedusting Agent | CC (g/g) | 0.3 psi AUL (g/g) | 0.6 psi AUL (g/g) |
|---|---|---|---|---|
| 1 | none (control) | 27.5 | 29.2 | 23.0 |
| 1A | 300 ppm LITTLE ONES ™ baby oil | 25.4 | 30.2 | 21.3 |
| 1B | 1000 ppm LITTLE ONES ™ baby oil | 25.2 | 28.7 | 20.2 |
| 1C | 1000 ppm CRISCO ™ cooking oil | 27.4 | 30.5 | 21.6 |

EXAMPLE 4

A test is conducted to determine dustiness of water-swellable polymers and surface tension of a liquid in contact with polymers treated with various amounts of light mineral oil and heavy mineral oil.

Samples of water-swellable polymer as in Example 1, DRYTECH™ 2035 from The Dow Chemical Company, are treated with various amounts of both light mineral oil (LMO), i.e. mineral oil having a Saybolt viscosity of 162 minimum available from Fisher Scientific 0121, and heavy mineral oil (HMO), i.e. mineral oil having a Saybolt viscosity of 158 maximum available from Fisher Scientific 0122, in the same manner as in Example 1. The samples are then tested in the same manner as Example 1 for amount of dust and surface tension. The data from these tests are set forth in Table 4 below.

TABLE 4

| Sample | Dedusting Agent | Weight Of Dust Below 10 microns (ppm) | Surface Tension (dynes/cm) |
|---|---|---|---|
| 4 | none (control) | 4.3 | 71.7 |
| 4A | 100 ppm LMO | 1.9 | 71.4 |
| 4B | 300 ppm LMO | 0.25 | 71.6 |
| 4C | 600 ppm LMO | 0.225 | 71.9 |
| 4D | 1000 ppm LMO | 0.380 | 71.7 |
| 4E | 3000 ppm LMO | 0.265 | 71.7 |
| 4F | 100 ppm HMO | 0.955 | 72.0 |
| 4G | 300 ppm HMO | 0.640 | 71.8 |
| 4H | 600 ppm HMO | 0.270 | 71.5 |
| 4I | 1000 ppm HMO | 0.355 | 71.7 |
| 4J | 3000 ppm HMO | 0.140 | 71.4 |

In view of the description and examples, other embodiments will be readily ascertained by those skilled in the art. Accordingly, the scope of the invention shall be limited only by the claims set forth below.

What is claimed is:

1. A composition comprising water-absorbent water-insoluble polymer particles, the particles bearing on their surface a physical coating of an effective amount of a hydrophobic liquid dedusting agent, wherein the dedusting agent is an alkane having between about 7 and about 18 carbon atoms, an alkene having between about 7 and about 18 carbon atoms, a natural oil, a silicone oil, or an ester, alcohol, or acid thereof or a mixture thereof, wherein the polymer is a carboxyl-containing water absorbent polymer selected from the group consisting of hydrolyzates of starch-acrylonitrile graft copolymers, partially neutralized products of starch-acrylic acid or starch-polyvinyl alcohol graft copolymers, saponification products of vinyl acetate acrylic ester copolymers, derivatives of copolymers of isobutylene and maleic anhydride, hydrolyzates of acrylonitrile copolymers, crosslinked products of hydrolyzates of acrylonitrile copolymers, crosslinked carboxyl methyl cellulose, crosslinked products of hydrolyzates of acrylamide copolymers, and partially neutralized products of polyacrylic acids, wherein the composition comprises no more than 2.5 ppm unassociated dust having a maximum diameter less than or equal to 10 microns, and wherein the composition is characterized by a 60 minute 0.3 psi (21,000 dynes/cm$^2$) Absorption under Load greater than 20 grams/gram.

2. The composition of claim 1 wherein the composition comprises no more than 100 ppm unassociated dust having a maximum diameter less than or equal to 10 microns upon being roll milled for 20 minutes.

3. The composition of claim 1 wherein the surface tension of an aqueous fluid that is in equilibrium with the composition and air is substantially maintained or increased as compared to said composition without a physical coating of the hydrophobic agent.

4. The composition of claim 1 wherein the dedusting agent is baby oil, castor oil, corn oil, cottonseed oil, olive oil, rapeseed oil, soybean oil, sunflower oil, or an ester, alcohol, acid, or mixture thereof.

5. The composition of claim 1 wherein the dedusting agent comprises vegetable oil.

6. The composition of claim 1 wherein the dedusting agent is a vegetable oil.

7. The composition of claim 1 wherein the dedusting agent is a cotton seed oil.

8. The composition of claim 1 wherein the dedusting agent is a olive oil.

9. The composition of claim 1 wherein the deducting agent is a rapeseed oil.

10. The composition of claim 1 wherein the dedusting agent is a soybean oil.

11. The composition of claim 1 wherein the dedusting agent is a sunflower oil.

12. The composition of claim 1 wherein the dedusting agent is an alkane having between about 7 and about 18 carbon atoms.

13. The composition of claim 1 wherein the dedusting agent is an alkene having between about 7 and about 18 carbon atoms.

14. The composition of claim 1 wherein the polymer is a partially neutralized product of polyacrylic acid.

* * * * *